United States Patent [19]
Orsing

[11] 4,095,516
[45] Jun. 20, 1978

[54] GRILLING APPARATUS

[76] Inventor: John Harry Orsing, Avangsgatan 2, S-253 71 Helsingborg, Sweden

[21] Appl. No.: 709,479

[22] Filed: Jul. 28, 1976

[51] Int. Cl.² .............................................. A47J 37/06
[52] U.S. Cl. .......................................... 99/390; 99/447; 126/25 A
[58] Field of Search ........................... 99/421, 339–340, 99/346, 389–390, 427, 446; 126/25

[56] References Cited

U.S. PATENT DOCUMENTS

| | | | |
|---|---|---|---|
| 1,282,230 | 10/1918 | Hoddenbach | 99/339 |
| 2,335,217 | 11/1943 | Tate | 99/390 X |
| 2,441,190 | 5/1948 | Fuller | 99/390 UX |
| 2,627,854 | 2/1953 | Sava | 126/25 R |
| 2,638,888 | 5/1953 | Molla | 126/25 A |
| 3,025,784 | 3/1962 | Williams | 99/446 |
| 3,045,581 | 7/1962 | Bernstein | 126/25 R X |
| 3,140,651 | 7/1964 | Barnett | 99/389 X |
| 3,302,555 | 2/1967 | Burwell | 99/390 |
| 3,324,788 | 6/1967 | LaFrance | 99/389 |

Primary Examiner—Stanley N. Gilreath
Assistant Examiner—Arthur O. Henderson

[57] ABSTRACT

In a grilling apparatus there are provided elongated fuel supports receiving particulate coal fuel, and which are loosely suspended at each end on shoulders provided in the housing of the apparatus.

9 Claims, 12 Drawing Figures

GRILLING APPARATUS

BACKGROUND OF THE INVENTION

1. Field of the Invention

The invention here disclosed relates to the broiling of foodstuffs.

More particularly the invention relates to a grilling apparatus or barbecue grill device wherein coal fuel is used for broiling steaks, sausages, hamburgers, fowl, fish or other foodstuff suspended in the grilling apparatus or disposed on a grid or rack over the hearth therein.

The grilling apparatus according to the invention is of the easily portable type to be used at picnics, outings and camping and at cookouts in the garden or on the beach.

2. Description of the Prior Art

Portable grills for outdoor use commonly comprise a tray having suitable air inlet openings to form the hearth of the grilling apparatus, which receives the coal fuel, usually charcoal in small pieces which are poured directly into the tray, charcoal cartridges comprising an air permeable casing enclosing pieces of charcoal, or briquettes comprising coal dust with a suitable binder, and an open-mesh grating of metal or a grill spit rotatably arranged on a suitable support above the hearth tray. There are no possibilities to adapt such a grilling apparatus to the form and the type of the foodstuff to be broiled therein. The only adjustment that can be made is that one can lift or lower the grating or spit in relation to the hearth by suitable control means or that one can dispose the grating or spit stepwise on different levels above the hearth tray.

The prior art grilling apparatus of this type also has the drawback that inflammable fat or juices having a high grease content which drip from the foodstuff being broiled always will hit the burning fuel in the hearth where it will be carbonized and cause an uncomfortable smell or will catch fire and cause soot production and burning of the foodstuff. Sooty and burnt foodstuff is unappetizing and moreover involves a health risk, if it is consumed.

There is also a prior art grilling apparatus comprising two box- or basket-like fuel supports receiving pieces of coal fuel such fuel support being pivoted to be moved towards and away from the foodstuff to be broiled about a pivot axis which extends along and below the bottom of the fuel support, or are displaceable towards and away from the foodstuff at opposite sides thereof. The fuel support or at least the sides thereof facing each other and the foodstuff comprise nets or grids. By adjusting the two fuel support to different pivoted or displaced positions it is possible to vary the intensity of radiant heat received by the foodstuff to be broiled which is suspended or otherwise supported in one way or other between the fuel support, but the possibilities to adjust the heat distribution over the foodstuff are limited, and moreover the heat generation will vary as the coal fuel is being consumed due to the fact that the coal fuel portion contained in the full support will shrink towards the bottom of the burners during burning.

SUMMARY OF THE INVENTION

It is a primary object of this invention to provide a grilling apparatus for coal fuel in which the foodstuff can be broiled not only from below but also or alternatively from one or both sides thereof.

Another object of this invention is to provide a grilling apparatus wherein the heat distribution and the heat effect can be varied as is called for by the actual broiling operation.

A further object of the invention is to improve the possibility to adjust the grilling apparatus to the form and character of the foodstuff to be grilled.

A still further object of the invention is to provide a grilling apparatus of a simple construction which can easily be cleaned after having been used.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the grilling apparatus for coal fuel of this invention comprises a housing for supporting the foodstuff to be broiled, a drip pan forming the base of said housing, individual fuel supports for receiving coal fuel, at least one pair of spaced supporting means on said housing, and means on said fuel supports resting on said supporting means, said fuel supports being supported by said supporting means spanning across the space therebetween.

The accompanying drawings which are incorporated in and constitute a part of this specification, illustrate embodiments of the invention and, together with the description, serve to explain the principles of the invention.

Figure 1:
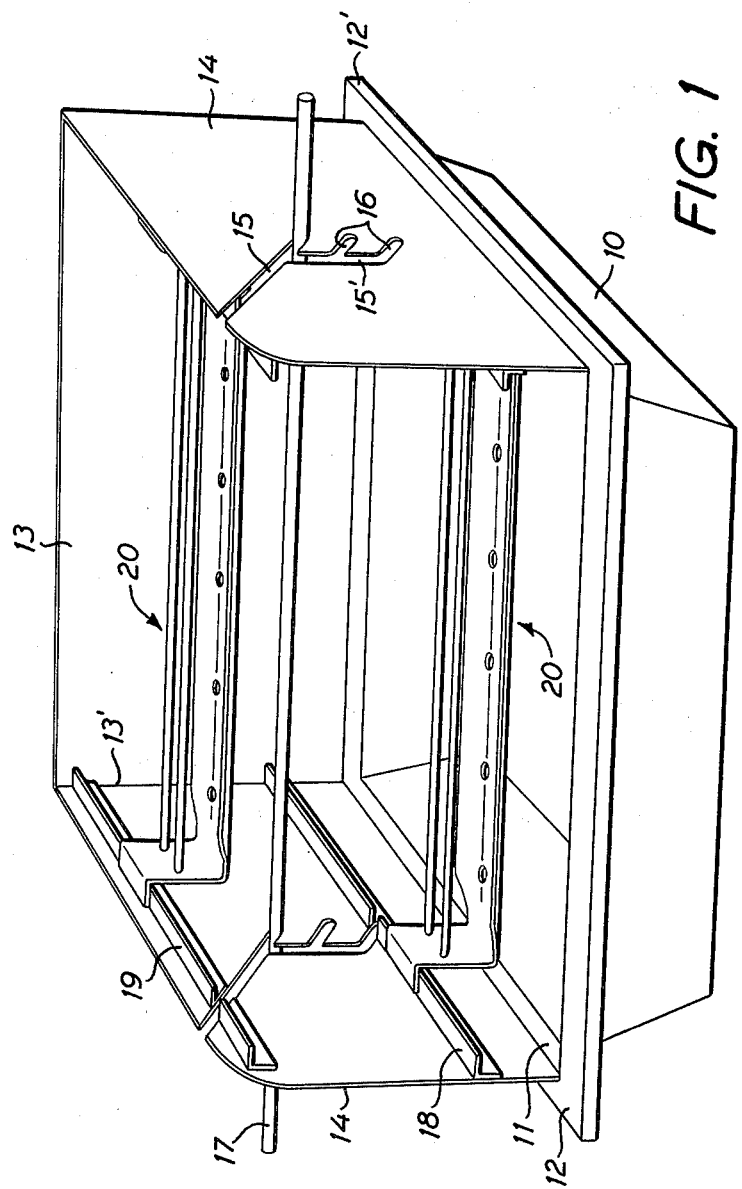
FIG. 1 is a perspective view of an illustrative grilling apparatus according to the present invention.

Reference will now be made in detail to the present preferred embodiments of the invention, exemples of which are illustrated in the accompanying drawings.

DESCRIPTION OF THE PREFERRED EMBODIMENTS

The grilling apparatus or barbecue grill device disclosed in the drawings comprises a housing including a drip pan or tray 10 of sheet metal having a horizontal bottom wall or floor and sloping side walls. Near the top edge of the pan the side wall forms an inside circumferential ledge 11 and an outwardly projecting stiffening flange 12 having a bent down marginal portion 12'. On ledge 11 are loosely disposed a back wall 13 and two side walls 14 forming vertical upward extensions of the side wall of the pan. Pan 10 and walls 13 and 14 form the body of the grilling apparatus, the pan being provided as the base thereof. Hinges may be arranged at the corners between the back and side walls at 13' such that walls 13 and 14 when demounted from the pan may be folded together to a flat package requiring a small space in order to facilitate storing and transporting of the grilling apparatus.

In each of the two side walls 14 there is provided a straight slot 15 extending from the upper edge of the side wall in an oblique angle thereto and joining at the lower end thereof a substantially vertical sot 15'. From slot 15' three slots 16 are branched at different levels, which are inclined downwardly therefrom. The system of slots in one side wall 14 are substantially opposite to the corresponding slot system arranged in the other side wall 14 and form suspension means for a grill spit indicated at 17 which is rotatably received in one of slots 16 in each side wall 14 and spans the space between side walls 14 above drip pan 10. The spit can be introduced into the desired slot 16 from the upper edge of side wall 14 through slots 15 and 15'. It will be understood that the spit may be suspended on either of three levels above the pan, defined by the respective slots 16.

There are provided on the inner surface of each side wall 14 two parallel angle rails, a lower one 18 and an upper one 19, which may be connected to the respective side wall at one leg by welding or riveting or in any other suitable way, the other leg forming a projecting shoulder.

A number of fuel supports are provided for receiving coal fuel bodies such as cartridges for instance of the type shown and described in U.S. Pat. No. 3,651,596 to Orsing, or briquettes comprising coal dust and a binder, two different embodiments of such fuel supports being disclosed in the drawings at 20 and 20', respectively.

Figure 2:
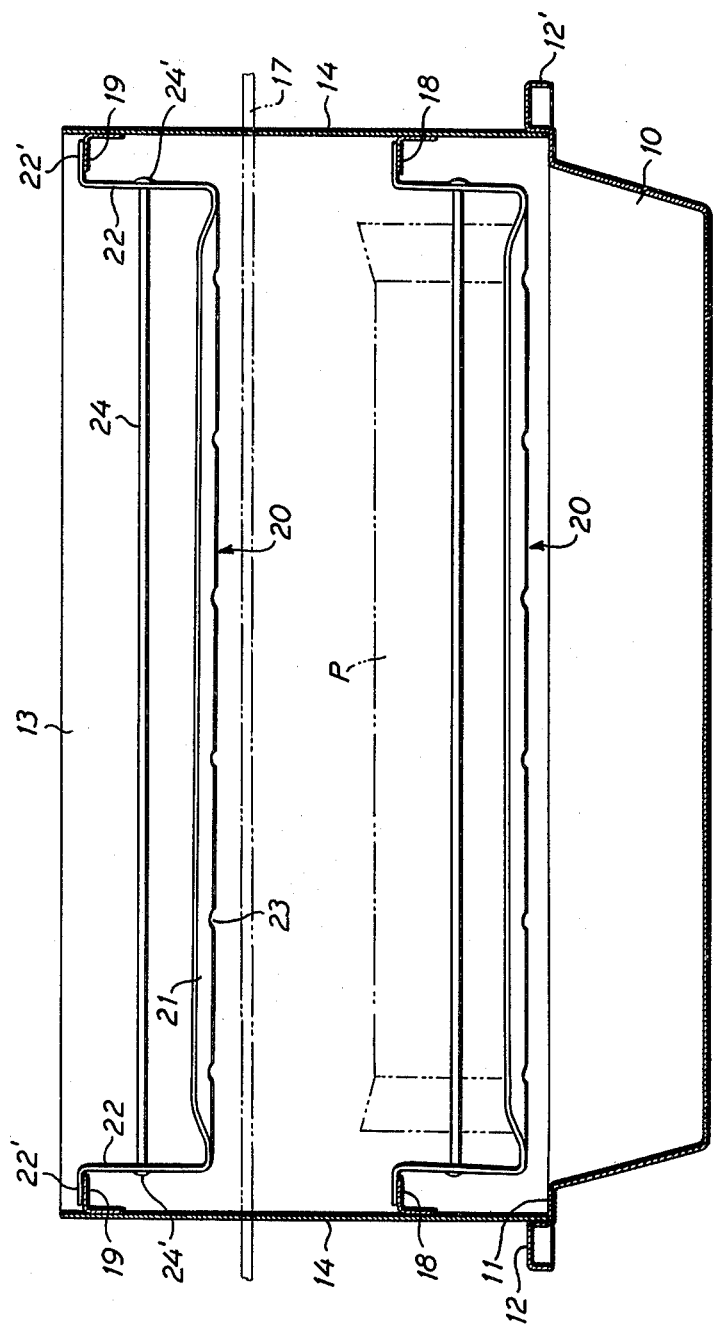
FIG. 2 is a longitudinal cross sectional view of the grilling apparatus in FIG. 1.
Figure 3:
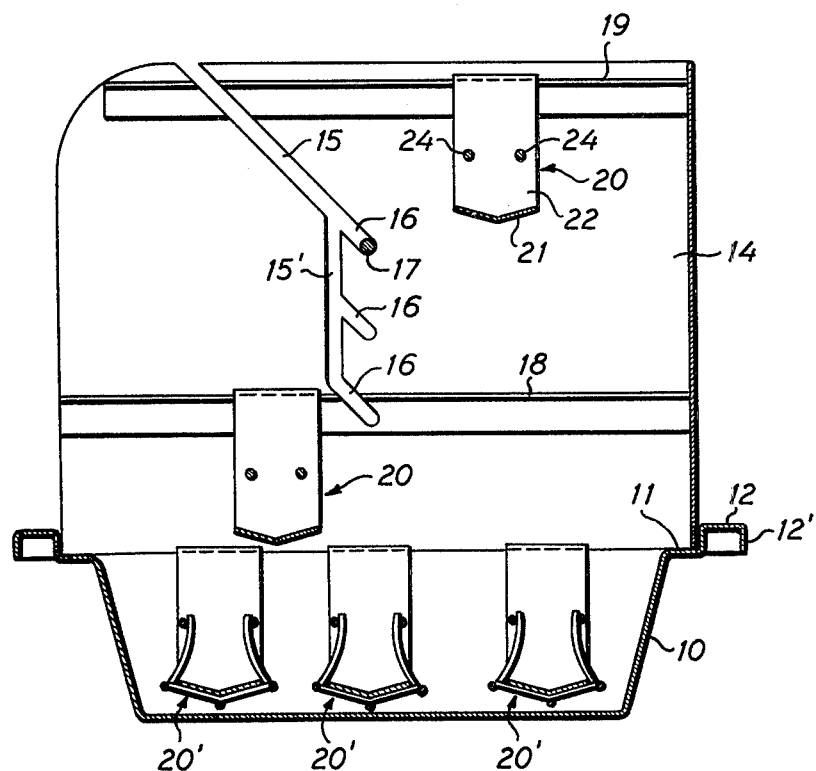
FIG. 3 is a transverse cross sectional view of the grilling apparatus.

Referring to FIGS. 1 and 2 each full support 20 disclosed therein comprises a chanelled bottom 21 of sheet metal which is of V-shaped cross sectional form and is bent up at the ends thereof to form two end walls 22 and then is bent out at the upper ends of the end walls to form two suspension flanges 22' projecting in the longitudinal direction of the supporting member in opposite directions. In the bottom there are arranged air inlet openings such as circular holes 23. However, such openings may be dispensed with. Above bottom 21 and spaced therefrom there are arranged two metal bars 24 extending along the bottom, which are connected to end walls 22 by being threaded through holes therein and then being deformed to form small heads 24'. These bars form side supports for a fuel cartridge or briquette indicated by dot and dash lines at P in FIG. 2 which is supported by bottom 21. It will be noted that side bars 24 are spaced inwardly of the edges of the bottom in order to maintain the fuel, cartridge or briquette at the central portion of the bottom, the bottom thus projecting laterally from the fuel. Thereby it should be prevented that fuel drops over the edges of the bottom in case the fuel should deteriorate during burning.

Figure 6:
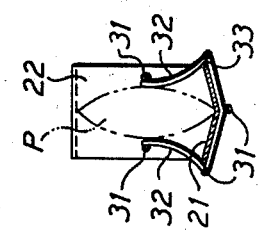
FIG. 6 is an end view of the fuel support in FIGS. 4 and 5.
Figure 4:
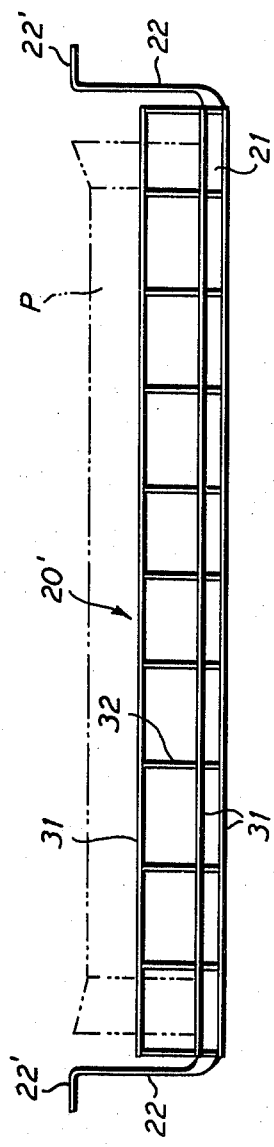
FIG. 4 is a side view of a fuel support.
Figure 5:
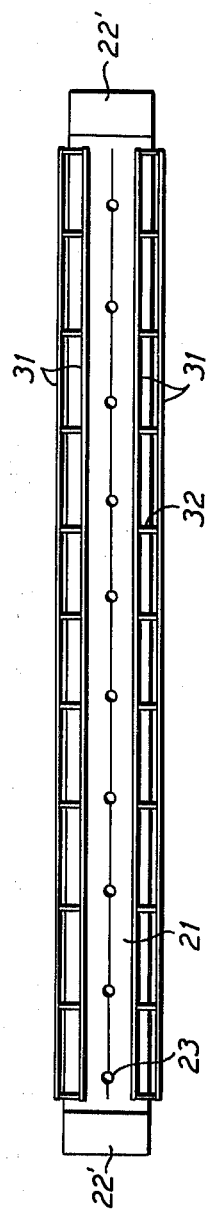
FIG. 5 is a plan view of the fuel support in FIG. 4.

With reference to FIGS. 4 to 6 burners 20' shown also in pan 10 in FIG. 2 each comprise a grid including longitudinal wires 31 and transverse wires 32 crossing at substantially right angles and interconnected at their crossings as by welding. The grid is bent around bottom 21 as shown in FIG. 6. At the longitudinal edges of the bottom the grid forms acute inside corners at 33 receiving the longitudinal edges of the bottom, the grid being connected to the bottom by the interengagement between the bottom and the grid provided thereby. Thus, the grid forms side supports on the bottom for retaining the fuel as shown in FIG. 4 where a fuel cartridge is indicated at P.

As will be seen fuel supports 20 and 20', respectively, can be suspended as desired either on the shoulder formed by ledge 11 on the side wall of drip pan 10 or on the shoulders formed by rails 18 or 19, as disclosed in FIGS. 1 and 2. Thus, when disposing the fuel supports in the grilling apparatus according to the invention a choice can be made between three different levels and on each level the fuel supports may be located in different positions horizontally. This is shown diagrammatically in FIGS. 7 to 9.

Figure 7:
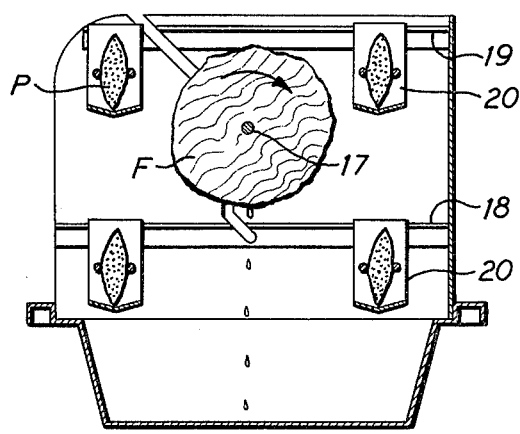
FIGS. 7 to 9 are diagrammatic views illustrating different modes of arranging the fuel supports in the grilling apparatus.

In FIG. 7 the foodstuff to be broiled is shown at F and is suspended in the grilling apparatus on a rotatable spit 17. Four fuel supports 20 (or 20') are suspended two on each side of the foodstuff on rails 18 and 19 and thus the foodstuff will be broiled by heat radiation from the sides only. Grease and juices dripping from the foodstuff are collected in drip pan 10 and will have no change to reach the burning fuel where the grease could catch fire and could cause a flame sooting the foodstuff or could produce an uncomfortable smell.

Figure 8:
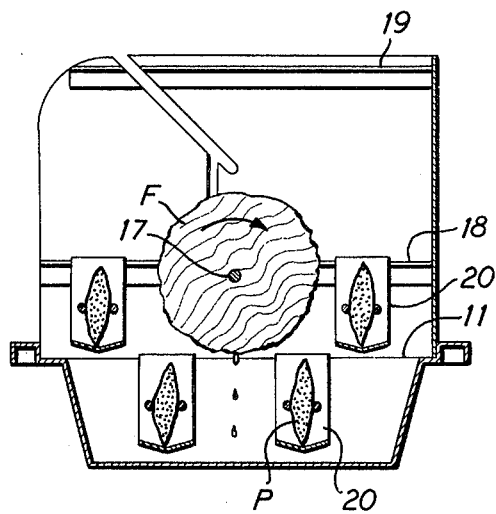

Also in case there are arranged fuel supports below the foodstuff ignition of grease or greasy juices may be avoided by the arrangement shown in FIG. 8. In this case there are arranged two fuel supports 20 (or 20') on rails 18 one on each side of the foodstuff F suspended on the rotatable spit 17, and there are arranged in the drip pan two further fuel supports on ledge 11. The lower burners are located one on each side of the vertical plane through the spit and thus grease and juice will drip into the pan between the two lower fuel supports which are spaced from each other.

Figure 9:
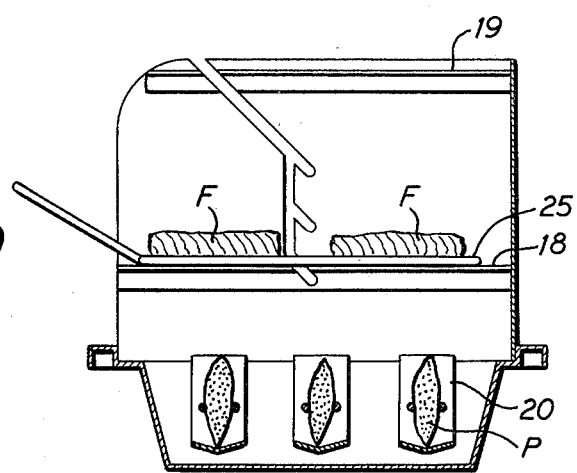

Finally, there is arranged according to FIG. 9 three fuel supports 20 (or 20') in the drip pan on ledge 11 in order to broil the foodstuff F placed on a grid 25 which is suspended in the grilling apparatus on rails 18. In this latter case the foodstuff will be heated from below only and there may be some difficulties to avoid dripping of grease and juice from the foodstuff into the burning fuel. However, there is provided according to the invention a grid or grate designed for use in the grilling apparatus according to the invention in combination with fuel supported by fuel supports in the manner described. This grilling grate is disclosed in FIGS. 11 and 12 and will be described in more detail later.

It would be obvious to one skilled in the art that other fuel support constructions may be envisaged on the basis of the two embodiments of such fuel supports disclosed herein. Thus, the sheet metal bottom could be dispensed with in the embodiment according to FIGS. 4 to 6 and the grid be bent to form also the end walls and the suspension members of the fuel support, the grid alone forming the bottom support for the fuel. However, this embodiment of the fuel support formed as an openwork basket is considered to be less preferable because the air supply through the bottom thereof may be too rich, the fuel thus being burnt too quickly. A sheet metal bottom will moderate the air supply to the fuel and there is the possibility to control the air supply by arranging a suitable number of air inlet openings of adjusted area in the sheet metal bottom.

Figure 10:
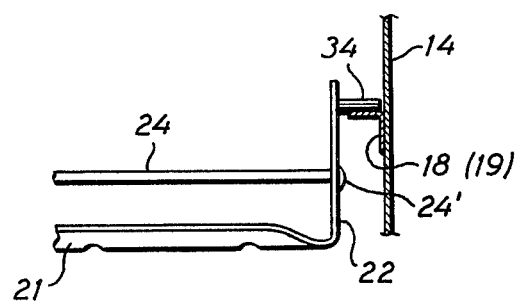
FIG. 10 is a fragmentary side view of a fuel support illustrating a modified suspension member thereof.

The suspension flanges 22' projecting from end walls 22 could be replaced by other suspension means, and as shown in FIG. 10 such flanges could be replaced by a cylindrical pin 34 fixed to end wall 22 for pivoted suspension of the burner such that the fuel support will be suspended vertically also in case the grilling apparatus would not be disposed on a horizontal support.

Figure 11:
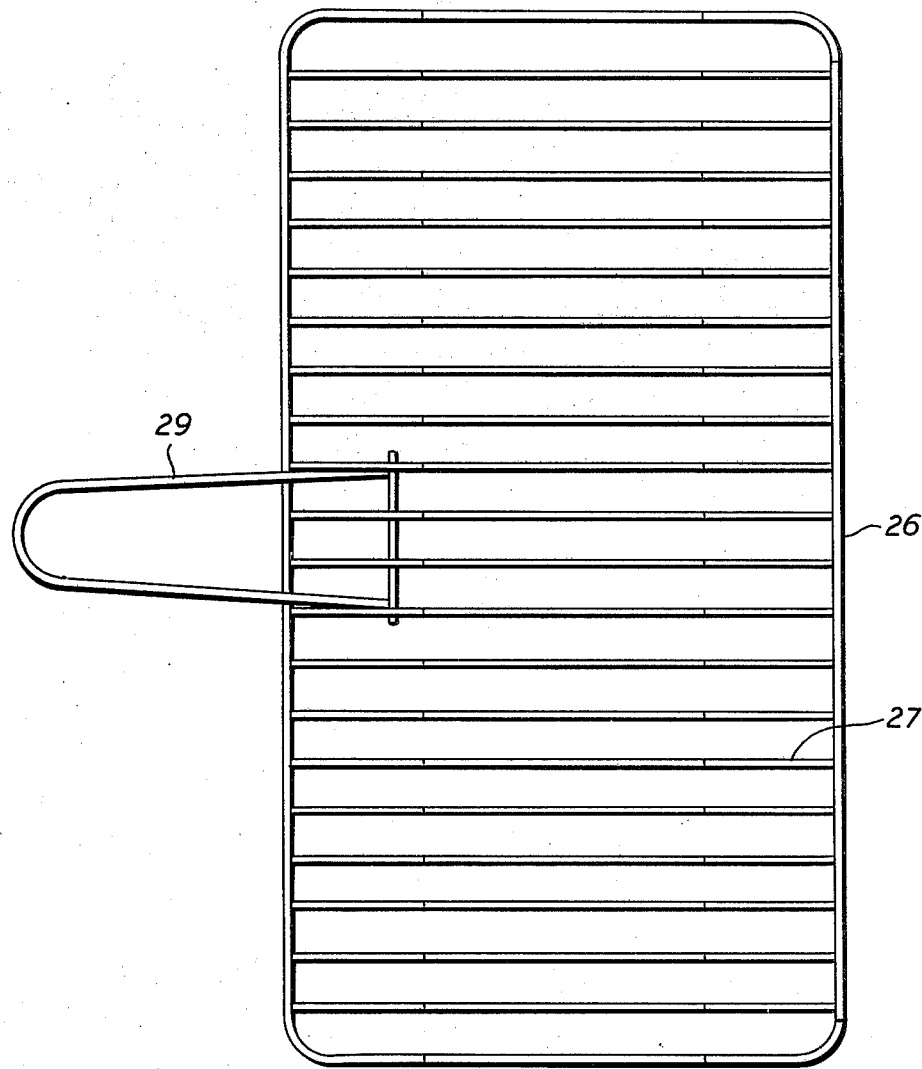
FIG. 11 is a plan view of a grate for supporting the foodstuff.
Figure 12:
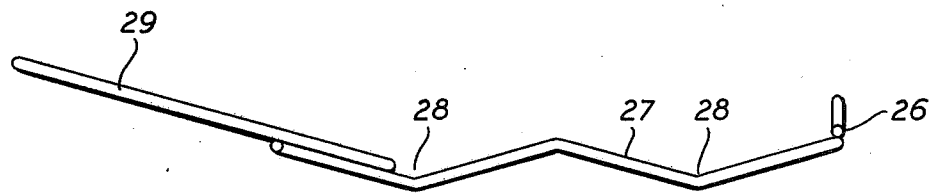
FIG. 12 is an end view of the grate in FIG. 7.

With reference to FIGS. 11 and 12 the grilling grate 5 disclosed therein comprises a rectangular circumferential frame 26 of wire and a plurality of parallel wires 27 extending between the longer sides of the frame in parallel with the shorter sides thereof. Wires 27 are connected to frame 26 by welding and are bent to zigzag form as shown in FIG. 12 to form flutes or channels 28. The grill grate is provided with a metal wire handle 29 connected by welding to the grate, and when used the grate is placed over the drip pan either on ledge 11 formed by the pan or on the shoulders formed by rails 18 or 19.

When foodstuff is broiled on the grid as shown in FIG. 9 grease or juice from the foodstuff will flow along wires 27 and will collect at the lower tips of channels 28 from which it will drip into drip pan 12. Now, the fuel supports may be located in the pan in such a manner that no fuel support is opposite said tips and, thus, the grease or juices will not hit the burning fuel supported by the fuel supports but will pass through spaces between the fuel supports and will be received by pan 10.

From the description above of the grilling apparatus or barbecue grill device of the invention it will be clear that the heat radiation from the fuel used in such grilling apparatus can be adjusted to different types and forms of foodstuff to be broiled in the apparatus in order to provide a suitably distributed heating and to avoid burning of grease or juices with a high grease content dripping from the foodstuff during the actual broiling. This can be done by arranging the fuel supports according to different patterns on different levels and in a desired position on each individual level as shown in FIGS. 7 to 9.

The grilling apparatus and the fuel supports provided therein are of a simple construction but nevertheless makes it possible to broil foodstuff in a manner and with a result as far as the quality of the treated foodstuff is concerned which is as good as that obtained in a gas or coal heated professional grilling apparatus of the type used in restaurants and bars.

The grilling apparatus is easy to clean because the fuel supports resting loosely on the shoulders formed by ledge 10 and angle bars 18 and 19 can easily be lifted out from the grilling apparatus. Furthermore, the grilling apparatus is of a simple construction without complicated parts and adjustment or control mechanism but nevertheless provides for such adjustments as are necessary for good broiling.

It will be apparent to those skilled in the art that various other modifications and variations in addition to those mentioned above could be made in the grilling apparatus of the invention without departing from the scope and spirit of the invention.

I claim:

1. A grilling apparatus using particulate fuel comprising a housing for supporting foodstuff to be broiled; a drip pan forming the base of said housing; a plurality of individual elongated channel fuel-receiving means for receiving particulate fuel; a plurality of spaced supporting means on said housing, arranged to support the fuel receiving means at different levels beneath and on each side of the foodstuff; the fuel-receiving means resting and supported on said supporting means; said fuel-receiving means spanning the space between the supporting means; and being disposed at a plurality of locations selected from beneath and on one side; or beneath and on both sides of the foodstuff.

2. A grilling apparatus as claimed in claim 1 wherein the supporting means are arranged at a plurality of different levels on the housing for supporting the fuel-receiving means at different levels with respect to the foodstuff.

3. A grilling apparatus as claimed in claim 1 wherein said supporting means comprises shoulders on said housing.

4. A grilling apparatus as claimed in claim 1 wherein said elongated channels have at each end abutment means for supporting engagement with said supporting means.

5. A grilling apparatus as claimed in claim 4 wherein said abutment means comprise pivot pins for pivoted suspension of said elongated channels.

6. A grilling apparatus as claimed in claim 1 wherein said housing comprises upstanding extensions on two opposite side walls of said drip pan, and means on said extensions supporting a spit spanning the space between the extensions, and said supporting means comprise shoulders on the sides of said extensions, facing each other, extending transversely of said spit on opposite sides thereof.

7. A grilling apparatus as claimed in claim 1 in which the fuel-receiving means are adapted to carry a coal fuel.

8. A grilling apparatus as claimed in claim 7 wherein the fuel-receiving means are adapted to carry charcoal.

9. A grilling apparatus as claimed in claim 1 wherein the fuel-receiving means comprises a channel which is substantially V-shaped in cross-section, and is bent up at the ends to form end walls, the end walls being bent outwardly at their upper ends to form flanges supportingly engaging the supporting means, the channel having a plurality of openings therethrough along the channel bottom.

* * * * *

UNITED STATES PATENT OFFICE
CERTIFICATE OF CORRECTION

Patent No. 4,095,516  Dated June 20, 1978

Inventor(s) John Harry Orsing

It is certified that error appears in the above-identified patent and that said Letters Patent are hereby corrected as shown below:

Column 1, line 46 : "support" should be --supports-- line 49 : "support" should be --supports-- line 51 : "support" should be --supports-- line 53 : "support" should be --supports-- line 57 : "support" should be --supports-- line 61 : "full support" should be --fuel supports--

UNITED STATES PATENT OFFICE
CERTIFICATE OF CORRECTION

Patent No. 4,095,516             Dated June 20, 1978

Inventor(s) John Harry Orsing

It is certified that error appears in the above-identified patent and that said Letters Patent are hereby corrected as shown below:

| | | |
|---|---|---|
| Column 3, line 13 | : | "sot" should be --slot-- |
| line 33 | : | Delete "bodies" |
| line 38 | : | "full" should be --fuel-- |
| line 61 | : | Delete "burners". After "FIGS. 4 to 6" insert --fuel supports-- |
| Column 4, line 23 | : | "change" should be --chance-- |
| line 33 | : | "burners" should be --fuel supports-- |

Signed and Sealed this

Sixth Day of February 1979

[SEAL]

Attest:

RUTH C. MASON
*Attesting Officer*

DONALD W. BANNER
*Commissioner of Patents and Trademarks*